United States Patent [19]

Neff

[11] 4,279,271

[45] Jul. 21, 1981

[54] PRESSURE REGULATOR AND FLOW CONTROL VALVE WITH PRE-EXHAUST

[75] Inventor: James A. Neff, Bloomfield Township, Oakland County, Mich.

[73] Assignee: Mac Valves, Inc., Wixom, Mich.

[21] Appl. No.: 71,735

[22] Filed: Aug. 31, 1979

[51] Int. Cl.$^3$ .......................... G05D 7/01; G05D 16/10

[52] U.S. Cl. .................................... 137/493.8; 91/443; 137/505.18; 137/529

[58] Field of Search .................. 137/493, 493.7, 493.8, 137/493.9, 505.18, 529, 599; 91/443, 447

[56] References Cited

U.S. PATENT DOCUMENTS

| | | | |
|---|---|---|---|
| 1,984,792 | 12/1934 | Ford | 137/540 X |
| 2,341,709 | 2/1944 | Friedell | 137/529 |
| 4,022,113 | 5/1977 | Blatt | 91/443 |
| 4,147,179 | 4/1979 | Miura | 137/599 |
| 4,175,473 | 11/1979 | Iizumi | 91/443 |
| 4,177,840 | 12/1979 | Neff et al. | 137/599 |
| 4,192,346 | 3/1980 | Iizumi | 137/599 |

FOREIGN PATENT DOCUMENTS

| | | | |
|---|---|---|---|
| 729945 | 3/1966 | Canada | 137/529 |
| 2738476 | 3/1978 | Fed. Rep. of Germany | 91/443 |
| 692610 | 6/1953 | United Kingdom | 137/529 |

*Primary Examiner*—Robert G. Nilson
*Attorney, Agent, or Firm*—Robert G. Mentag

[57] ABSTRACT

A combination pressure regulating and flow control valve having an upstream port and a downstream port interconnected by a flow passage. An adjustable pressure regulating valve is mounted in said flow passage for regulating the downstream pressure in said flow passage. The adjustable flow control valve is mounted in parallel with said pressure regulating valve in said flow passage for providing a meter out action on pressurized air flowing through said passage from said downstream port to said upstream port. The adjustable fluid flow control valve is shown in one embodiment as being provided with an adjustable quick exhaust valve structure for quickly dumping the exhausting air to reduce the pressure thereof to a reduced predetermined level, after which the meter out action follows.

14 Claims, 9 Drawing Figures

PRESSURE REGULATOR AND FLOW CONTROL VALVE WITH PRE-EXHAUST

TECHNICAL FIELD

This invention relates generally to the valve art, and more particularly, to an improved air valve which combines the functions of pressure regulating and flow control, together with an adjustable quick exhaust valve means for quickly exhausting the downstream pressure in an air supply system. The valve of the present invention is adapted for use in an air flow line for controlling both the pressure and flow of air in the line as, for example, an air supply line connected to one end of an air cylinder.

BACKGROUND ART

It is known in the air valve art to provide single or multiple pressure regulators to control the pressure of air supplied to an air cylinder or other device being controlled. Heretofore, multiple pressure regulators have been employed by mounting multiple directional valves in stacking fashion or on a common manifold base. However, such structure is expensive and awkward in use, and it is extremely difficult and expensive to provide pressure regulation to individual outlets. Because of the high cost, small space and relatively short life of diaphragms, and other components of pressure regulators, it is not common to use such multiple pressure regulators in a line between the outlet or cylinder port of a directional valve and a device being controlled as, for example, an air cylinder. Heretofore, it was known to provide flow control means in an air line between a directional control valve and a device being controlled as, for example, an air cylinder. Due to the complexity, space requirements and cost, it has not been practical heretofore to provide both pressure regulator means and flow control means between the cylinder port of a directional control valve and a device being controlled, such as an air cylinder. The result has been a waste of air requiring excessive pumping capacity, a waste of energy, and an increase in the cost of using air as a power and control means. Examples of the prior art regulating valves are illustrated in U.S. Pat. Nos. 2,501,483; Re. 29,292; 3,400,735; 3,621,867 and 3,376,792. A further disadvantage of the prior art pressure regulating and flow control valves is that they did not provide a quick pre-exhaust function for quickly reducing the downstream pressure to a desired level. A combination pressure regulating and flow control valve has been provided as shown in applicant's co-pending U.S. application Ser. No. 786,273, and entitled "Pressure Regulating and Flow Control Valve". However, the pre-exhaust valve disclosed in the last mentioned application is located in a separate pre-exhaust flow path, parallel to the flow control path and accordingly, it requires a larger, more expensive, and more complicated valve body structure to include the separate pre-exhaust flow path.

DISCLOSURE OF THE INVENTION

In accordance with the present invention, a combination pressure regulating and flow control valve is provided which can be installed in any air cylinder, or air actuation line, to regulate the pressure in one direction and control the flow of air in the other direction. The combination valve includes an adjustable pressure regulator and check valve which is constructed and arranged to regulate the pressure of air supplied to one end of an air cylinder. The combination valve also includes an adjustable combination flow control and pre-exhaust valve for controlling the flow of air exhausting from said one end of an air cylinder.

The combination pressure regulator and check valve includes a regulator valve which is slidably mounted on a lower stem for controlling the flow of fluid through a single passageway means which interconnects an upstream or supply port with a downstream or cylinder port in a valve body. The lower stem member is adjustable by a regulator spring which is adjusted by a movable upper stem member. The regulator valve is movably mounted on the lower stem to permit the regulator valve to function as a regulator valve when air is flowing from the upstream port to the downstream port, and to function as a check valve to prevent return flow from the downstream port through the passageway means back to the upstream port. A combination flow control and pre-exhaust valve is operatively mounted in the passageway means, in parallel with the regulator and it functions as a check valve when the regulator valve is operative, and then it functions to quickly exhaust to downstream pressure to a previously set level, and vent to exhaust the remaining downstream pressurized air through the passageway means in a meter out or flow control condition. The regulator valve is moved to the closed position by differential pressure, and it functions as a check valve to check any flow through the passageway and back to the supply port when the downstream pressure is exhausting. In a second embodiment, the flow control valve does not include any pre-exhaust valve structure, and it only provides a meter out or flow control condition through the passageway means when air is exhausted from the downstream port to the upstream port.

The combination pressure regulating and flow control valve of the present invention overcomes the disadvantages of the aforementioned prior art valve structures in that no separate pressure regulating device is required to reduce the pressure to a required lower operating pressure, whereby a saving of air is provided at a minimum of cost. The valve of the present invention also provides a pre-exhaust function with a minimum number of flow passages through the valve body. The combination flow control and pre-exhaust valve permits a valve to be built with a flow control function and a pre-exhaust function when air is exhausted through the valve from the downstream port to the upstream supply port in a more efficient and economical manner. The valve body structure for the valve of the present invention is simpler than the prior art valve body structures. The simpler valve structure results in lower tooling and manufacturing costs. The valve of the present invention is advantageous in that it provides, in one compact and economical unit, a flow control valve which functions first as a pre-exhaust valve and then secondly functions as a flow control or metering valve. The valve of the present invention is also advantageous in that the regulator valve is constructed and arranged to function both as a regulator valve and a check valve.

BEST MODE OF CARRYING OUT THE INVENTION

Figure 1:
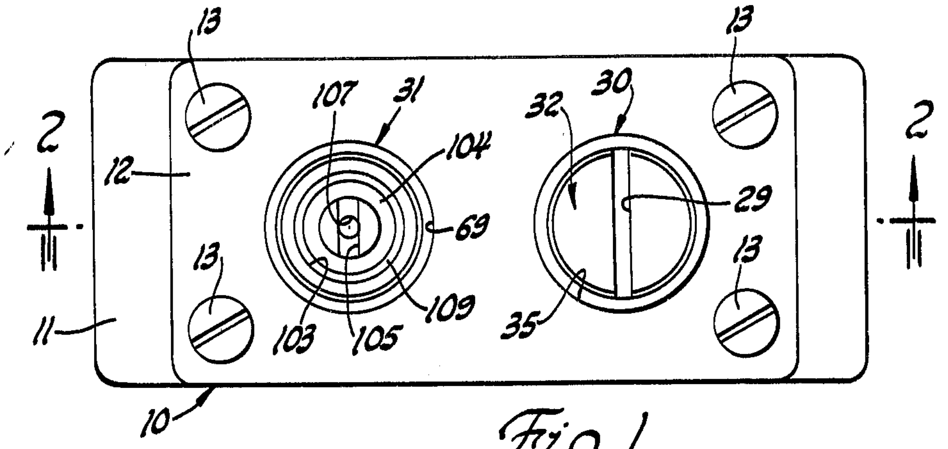
FIG. 1 is a top plan view of a combination pressure regulating and flow control valve made in accordance with the principles of the present invention.
Figure 2:
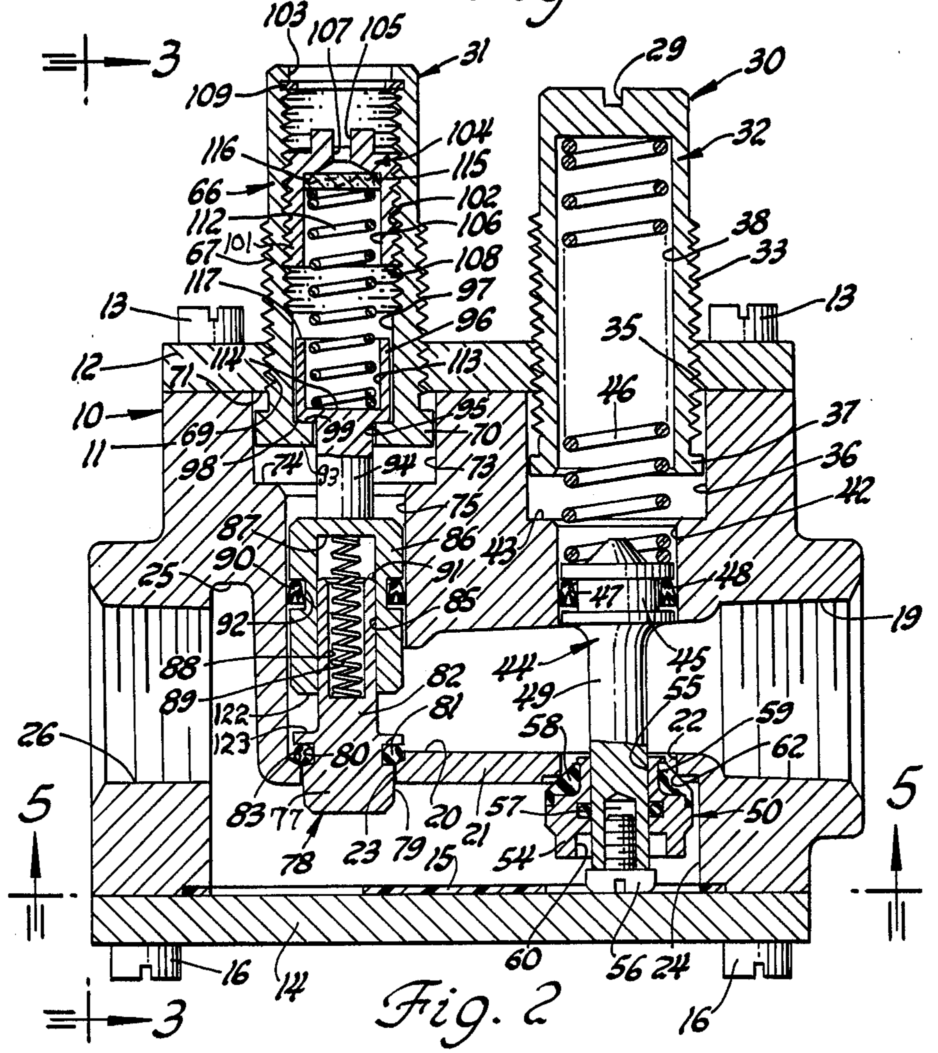
FIG. 2 is an elevation section view of the valve structure illustrated in FIG. 1, taken along the line 2—2 thereof, looking in the direction of the arrows, and showing the valve in a position with no pressure applied at either port.
Figure 3:
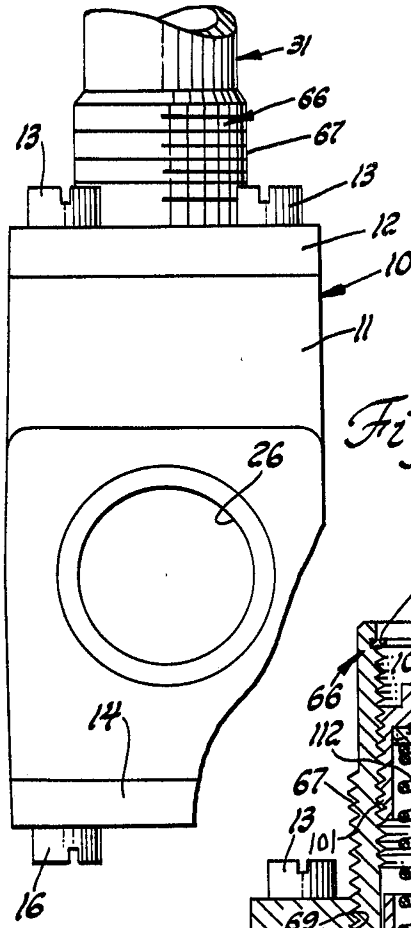
FIG. 3 is a left side elevation view of the valve structure illustrated in FIG. 2, taken along the line 3—3 thereof, and looking in the direction of the arrows.

Referring now to the drawings, and in particular to FIGS. 1, 2 and 3, the numeral 10 generally designates a first illustrative embodiment of a combination pressure regulating and flow control valve made in accordance with the principles of the present invention. The valve 10 includes a valve body 11 which is enclosed on the top side by a top end cover plate 12 which is releasably secured in position on the valve body 11 by a plurality of suitable machine screws 13. A suitable bottom end cover plate 14 encloses the bottom end of the valve body 11, and it is releasably secured thereto by a plurality of suitable machine screws 16. A suitable gasket 15 is disposed between the bottom end cover plate 14 and the valve body 11.

The valve body 11 is provided with a threaded supply or upstream port 19 which is adapted to be connected by conduit means to a suitable source of supply of pressurized air. The supply port 19 communicates with an interior upper or first passageway 20 which is centrally formed through the valve body 11. The upper interior passageway 20 communicates through a pair of longitudinally spaced apart bores or passageways 22 and 23 with a lower interior second passageway 24. The bores 22 and 23 are formed through a dividing wall 21 which is disposed between the passageways 20 and 24. As viewed in FIG. 2, the left end of the passageway 24 has a portion 25 which communicates with a threaded downstream or cylinder port 26. The downstream port 26 is adapted to be connected to an apparatus to be controlled as, for example, the head end of an air cylinder.

As shown in FIG. 2, a combination pressure regulator and check valve, generally indicated by a numeral 30, is operatively mounted in the valve body 11 for controlling the flow of pressurized air entering the valve 10 through the supply port 19 and passing from the upper interior passageway 20 through the bore 22 into the lower interior passageway 24 and out through the downstream port 26. The numeral 31 in FIG. 2 generally designates an adjustable combination flow control and pre-exhaust valve means for controlling the flow of exhausting air from the downstream port 26 and the lower interior passageway 24 upwardly into the upper interior passageway 20 and out through the supply port 19.

As shown in FIG. 2, the adjustable pressure regulator and check valve 30 includes an upper cylindrical valve stem, generally indicated by the numeral 32, which is provided with peripheral thread 33 on the lower end thereof. The threaded lower or inner end of the valve stem 32 is threadably mounted through a threaded bore 35 which is formed through the top end cover 12, and it is extended downwardly into an enlarged bore 36 which is vertically formed in the valve body 11. A peripheral stop flange 37 is integrally formed on the lower or inner end of the valve stem 32, below the thread 33, and it is adapted to function as a stop member when the upper valve stem 32 is threaded outwardly, or upwardly, so as to bring the stop flange 37 into an abutting engagement with the inner face of the cover plate 12 through which is formed the threaded bore 35. The upper valve stem 32 is provided with a transverse slot 29 on the upper outer end for the reception of a suitable tool for adjusting the upper valve stem 32.

As shown in FIG. 2, the upper valve stem 32 is provided with an axial bore 38 which extends upwardly from the inner end, and in which is operatively seated the upper end of a pressure regulating coil spring 46. The lower end of the regulating coil spring 46 extends downwardly into a reduced diameter communicating bore 42 in the valve body 11. A transverse shoulder 43 is formed at the junction point between the inner end of the bore 36 and the adjacent upper end of the bore 42. The lower end of the bore 42 communicates with the upper interior passageway 20.

Figure 4:
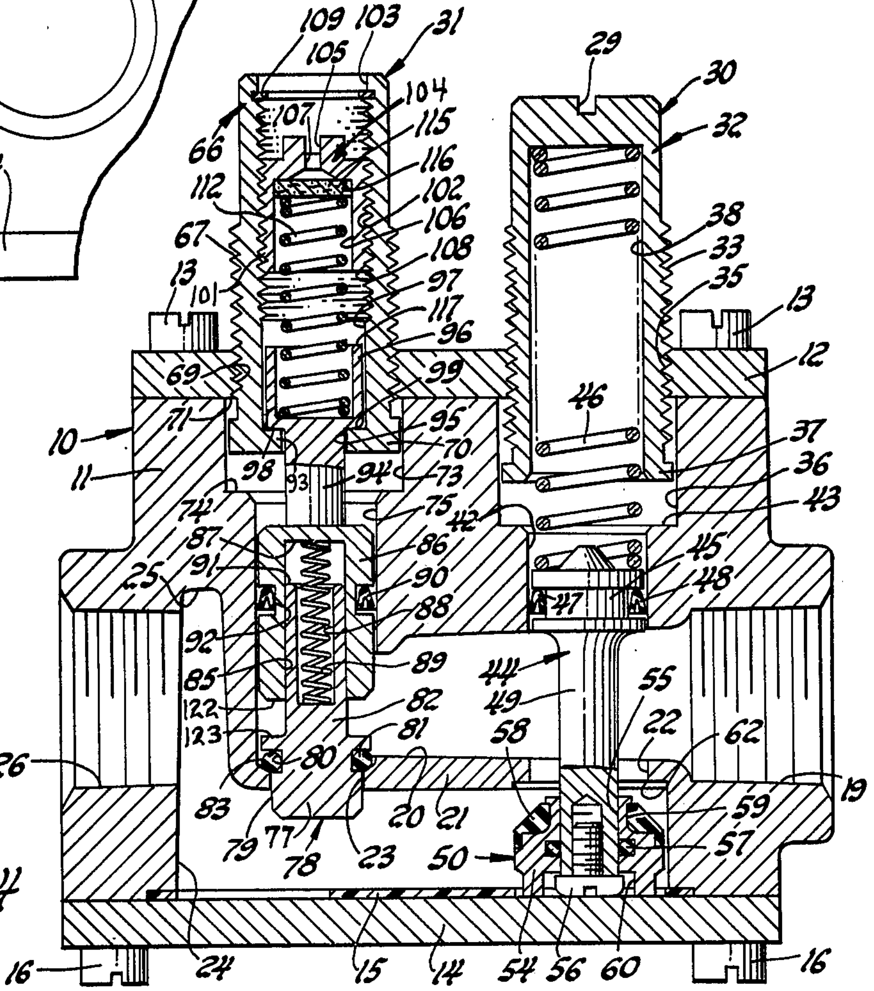
FIG. 4 is an elevation section view, similar to FIG. 2, and showing the position of the valve structure of FIG. 2 when the regulator valve is open and pressurized air is flowing from the inlet port to the outlet or cylinder port.
Figure 5:
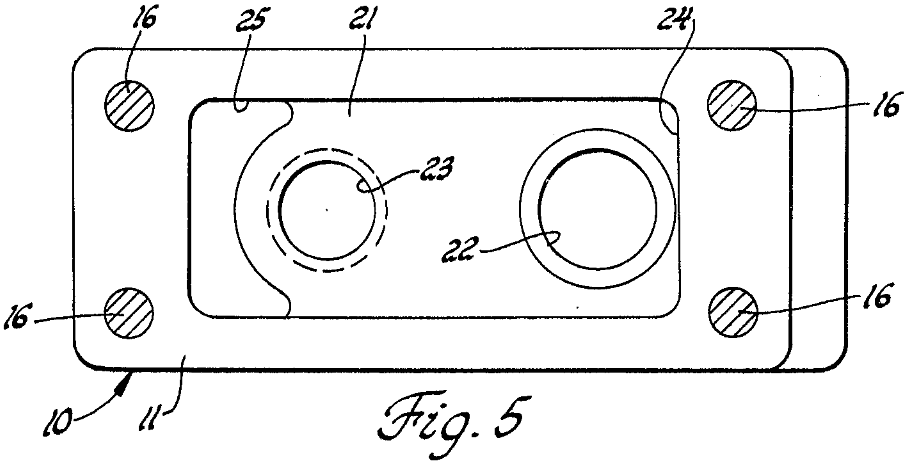
FIG. 5 is a bottom plan view of the valve body structure illustrated in FIG. 2, with the bottom end cover removed, taken along the line 5—5 thereof, and looking in the direction of the arrows.

As shown in FIG. 2, the lower end of the regulating coil spring 46 abuts the upper, head end of a lower valve stem, generally indicated by the numeral 44. The lower valve stem 44 includes the head or piston 45 which is slidably mounted in the bore 42. The lower valve stem head end 45 is provided with a peripheral groove 47 in which is operatively mounted suitable seal means 48. The lower valve stem 44 further includes an elongated, cylindrical guide rod portion 49 which is integrally attached at its upper end to the lower side of the valve stem head end 45. The guide rod portion 49 extends downwardly across the upper interior passageway 20, and through the bore 22, and thence into the lower interior passageway 24. A combination regulating and check valve element, generally indicated by the numeral 50, is slidably mounted on the lower end of the guide rod portion 49, in the lower interior passageway 24, and it is movable between a raised, closed or checked position, as shown in FIG. 2, and a lowered, open position as shown in FIG. 4.

The combination regulating and check valve element 50 includes an annular valve body 54 (FIG. 2) which has an axial bore 55 therethrough in which is slidably received the guide rod portion 49. The annular valve body 54 is retained on the guide rod portion 49 by a suitable retainer screw 56 which is threadably mounted in a threaded axial bore that is formed in the lower end of the guide rod portion 49, as viewed in FIG. 2. A suitable seal 57 is operatively mounted in an internal groove formed in the annular valve body 54 around the bore 55, and it sealingly engages the guide rod portion 49. The annular valve body 54 has an annular valve element 58 molded thereon which has a conically shaped upper peripheral face.

The valve element 58 may be made from any suitable elastomeric material which is secured onto the upper end of the annular valve body 54 in the annular groove 59 by any suitable means. The lower end of the surrounding bore 22 terminates at a sharp junction point with the upper wall surface of the lower interior passageway 24 to form a circular, sharp edged valve seat 62 against which the tapered or conically disposed valve element 58 is adapted to be operatively seated when the regulator and check valve element 50 is in the closed or checked position shown in FIG. 2. An annular recess 60 is formed in the lower end of the valve body 54 and it receives the head of the retainer screw 56 when the valve body 54 is in the open position shown in FIG. 4 to permit valve body 54 to seat against the bottom plate 14, as shown in FIG. 4.

As shown in FIG. 2, the combination flow control and pre-exhaust valve 31 includes a cylindrical valve stem, generally indicated by the numeral 66, which is provided with peripheral thread 67 on the lower or inner end thereof. The threaded lower or inner end of the valve stem 66 is threadably mounted through a threaded bore 69 which is formed through the top end cover 12, and it is extended downwardly into an enlarged bore 73 which is vertically formed in the valve body 11. A peripheral flange 70 is integrally formed on the lower or inner end of the valve stem 66, below the thread 67, and it is adapted to function as a stop member when the valve stem 66 is threaded outwardly, or upwardly, so as to bring the stop flange 70 into an abutting engagement with the inner face 71 of the cover plate 12 through which is formed the threaded bore 69.

The lower or inner end of the bore 73 communicates with the outer end of a reduced diameter bore 75 which communicates at its inner end with the upper interior passageway 20. A shoulder 74 is formed at the junction point between the bores 73 and 75 and it functions as a stop for limiting the inward movement of the valve stem 66.

As shown in FIG. 2, a combination flow control and pre-exhaust poppet valve element, generally indicated by the numeral 78, is operatively associated with the valve stem 66, as described in detail hereinafter. The combination flow control and pre-exhaust poppet valve element 78 also functions as a check valve in some circumstances, as explained more fully hereinafter. The combination flow control and pre-exhaust poppet valve element 78 includes a conical nose portion 77 which has a shaped, converging peripheral side face 79.

As shown in FIG. 2, the combination flow control and pre-exhaust poppet valve element conical nose portion 77 is provided with a peripheral groove 80 around its upper end in which is operatively mounted a suitable seal 81. In the closed position, the seal 81 is adapted to be seated on an inwardly tapered circular valve seat 83 which is formed at the upper end of the bore 23, and which seat 83 has a sharp inner circular edge.

As shown in FIG. 2, the combination flow control and pre-exhaust poppet valve element 78 includes an elongated cylindrical valve stem 82 which has its lower end integrally attached to the conical nose portion 77. The valve stem 82 is slidably mounted in a cylindrical bore 85 which is formed in the lower end of a cylindrical pre-exhaust piston 86. The numeral 87 indicates the upper end wall of the bore 85 in the piston 86. A longitudinal bore 88 is formed in the upper end of the valve stem 82 and it extends downwardly from the upper end 91 of the stem 82. A suitable light coil check valve spring 89 has the lower end thereof mounted in the stem bore 88 and the upper end extended into the bore 85 and seated against the upper end wall 87 of the bore 85. A suitable annular seal 90 is mounted in an annular groove 92 formed in the outer periphery of the piston 86, and it sealingly engages the bore 75.

A piston rod 94 has its lower end engaged with the upper end of the piston 86 and its upper end extends upwardly through a bore 95 which is formed axially through the lower end transverse wall 93 of the valve stem 66. The upper end of the piston rod 94 is integrally attached to the lower closed end of a piston 96 which is slidably mounted in a bore 97 formed in the lower end of the valve stem 66. In the position shown in FIG. 2, the lower end 98 of the piston 96 is seated on the shoulder 99 formed by the junction of the two bores 95 and 97.

A pre-exhaust valve stem, generally indicated by the numeral 104, is threadably and telescopically mounted in the valve stem 66. As shown in FIG. 2, the pre-exhaust valve stem 104 has a peripheral thread 101 formed around the periphery thereof for threaded engagement in a threaded bore 102 in the valve stem 66. The inner end of the threaded bore 102 terminates at the upper end of the bore 97. The upper end of the threaded bore 102 terminates at the inner end of a bore 103 which is open to the atmosphere. An axial bore 106 is formed in the pre-exhaust valve stem 104, and it extends upwardly from the lower end 108 thereof and receives the upper end of a pre-exhaust valve adjusting spring 112. The spring 112 is seated against a filter disc 115 which is seated against the inner end wall 116 of the bore 106. The lower end of the spring 112 is seated in an axial bore 113 in the piston 96. The bore 113 extends downwardly from the upper end 117 of the piston 96 to the lower bore end wall 114. The spring 112 is a heavier spring than the light flow control spring 89, for controlling the pre-exhaust action of the poppet valve element 78, as described hereinafter.

The pre-exhaust valve stem 104 includes an integral, cylindrical upper head end which has a transverse slot 105 formed on the upper end thereof for the reception of a screw driver or other tool for rotatably adjusting the valve stem 104 relative to the pressure reduction required by the pre-exhaust action prior to the flow control action. A retainer ring 109 is operatively mounted in the valve stem 66 in the bore 102, adjacent the upper or outer end thereof, to retain the pre-exhaust valve stem 104 in the flow control valve stem 66. A vent bore 107 is formed through the head end of the valve stem 104 to vent the bore 106 to the atmosphere.

The valve of the present invention may be used in various air flow control applications for controlling the flow of air to and from an apparatus to be controlled and where a reduced downstream pressure is desired. An example is in the control of the flow of pressurized fluid to either end of an air cylinder, as to the head or piston end of an air cylinder for moving an air cylinder piston through a working stroke, and then controlling the exhausting of air from the piston end of the cylinder to allow the piston to be returned to the starting position. In the last mentioned application, the working pressure to be admitted to the piston end of the cylinder may be 80 lbs., per square inch, as an example, while the pressure admitted to the rod end of the cylinder for returning the piston may only be 30 lbs. per square inch, as an example. Accordingly, it is necessary to quickly reduce the pressure in the piston end of the cylinder to allow the low return pressure admitted to the rod end of the cylinder to return the piston to its initial position without any undue delay. The operation of the valve 10 will be explained hereinafter for controlling the flow of pressurized air to the piston end of an air cylinder, but only as one illustrative use of the valve of the present invention.

In the aforedescribed use, FIG. 2 shows the valve 10 at rest, with no pressure at the supply port 19 or the downstream port 26. The valve stem 32 of the pressure regulator valve 30 is threaded inwardly to provide the desired spring pressure on the lower valve stem 44, equivalent to the desired downstream pressure. Valve stems 66 and 104 are adjusted inwardly to the desired positions, in accordance with the control desired by the quick pre-exhaust function and the flow control function of the valve 31. The valve stem 104 controls spring 112 and the pre-exhaust function. The valve stem 66 controls the flow control function.

When air under pressure is admitted from a suitable source into the supply port 19, the regulator valve element 50 is moved downwardly to the open position shown in FIG. 4 to allow air under pressure to pass from the upper interior passageway 20 down into the lower interior passageway 24 and then out through the downstream port 26 to the head end of the cylinder to provide working air under pressure to the cylinder piston. The pressurized air in the upper interior passageway 20 functions to move the flow control valve 78 downwardly into sealing engagement with the valve seat 83 so that the flow control valve 78 functions as a check valve, and pressurized air can only flow from the upper interior passageway 20 to the lower passageway 24 through the bore 22. As the flow of pressurized air continues, pressure is built up downstream until it reaches an amount that is equivalent to the load applied to the regulating spring 46. The regulating valve 50 will then be moved upwardly to the position shown in FIG. 6, whereby the downstream pressure is reduced to a predetermined level.

The bore 42 is of the same diameter as the bore 22, and the regulating valve 30 is balanced in regard to the pressure of air entering the supply port 19 and passing into the upper interior passageway 20. Accordingly, when the downstream pressure in the air line connected to the piston end of the cylinder, and the pressure in the lower interior chamber 24 reaches a pressure equivalent to the preset load created by the adjustment of the valve stem 32 on the spring 46, the regulator valve 50 is moved to the closed position shown in FIG. 6.

Figure 6:
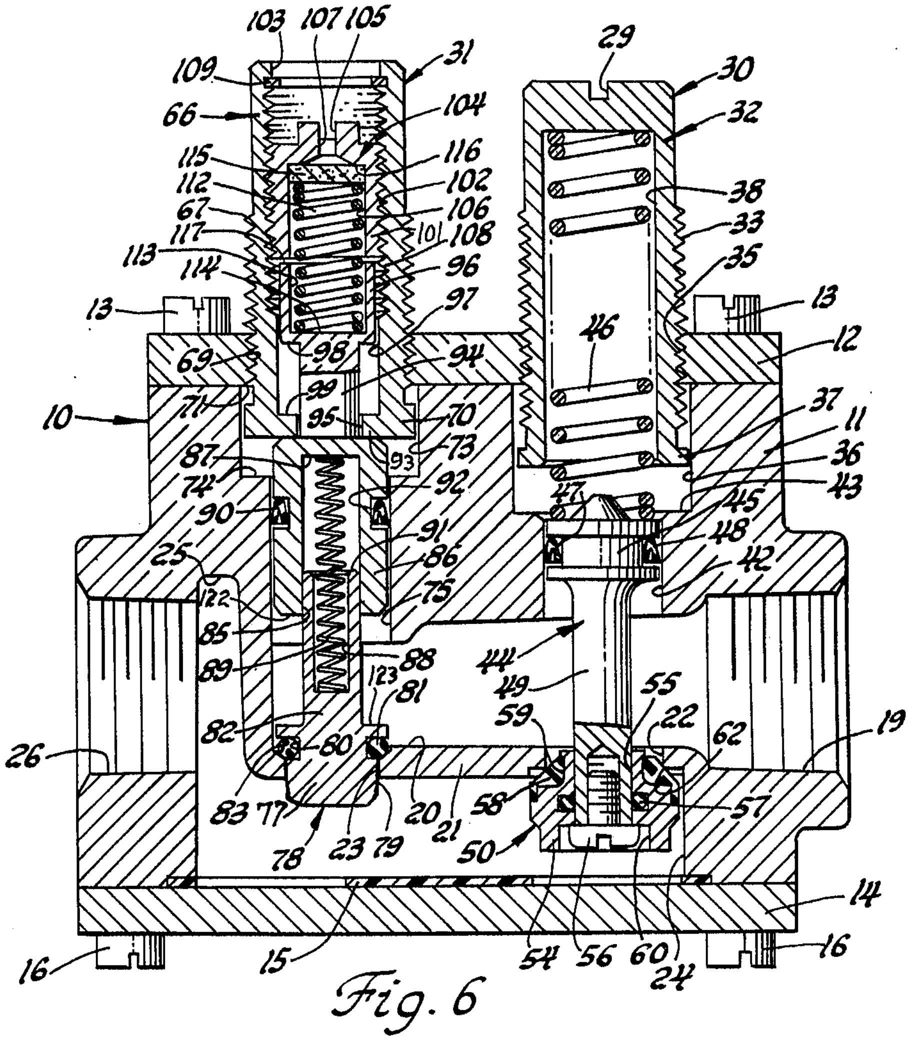
FIG. 6 is an elevation section view, similar to FIG. 2, and showing the valve structure when the downstream pressure is reduced to a pre-determined level, and the pressure regulator valve is in an at-rest position and there is no flow of air through the valve structure.

In the position shown in FIG. 6, there is no air flow through either the bore 22 or the bore 23, and the downstream pressure is regulated to the desired pressure. The pressure in the upper interior passageway 20 forces the piston 86 upwardly to the position shown in FIG. 6, because of the differential pressure on the sealed piston 86 caused by atmospheric pressure on the outer end and line pressure on the inner end. The upward movement of the piston 86 compresses the spring 112, as shown in FIG. 6. As shown in FIG. 6, the pre-exhaust piston 86 is moved upwardly until the upper end thereof abuts the lower or inner end of the valve stem 66.

Figure 7:
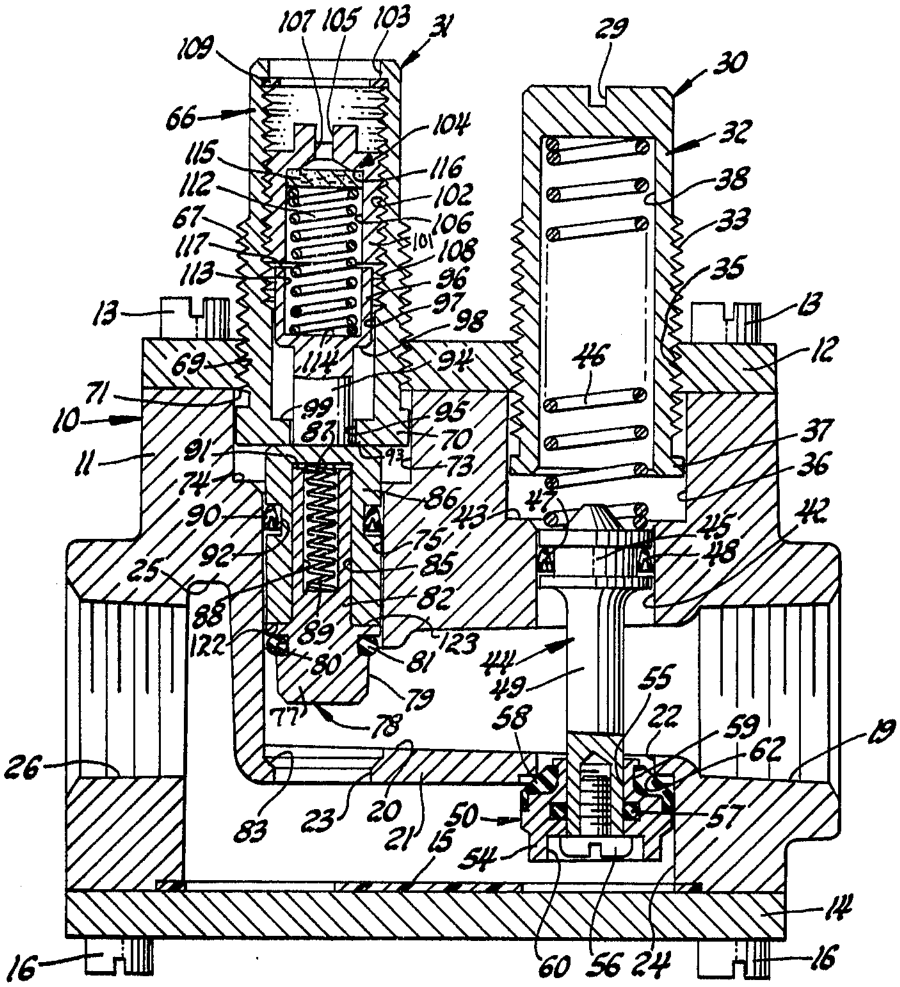
FIG. 7 is an elevation section view, similar to FIG. 2, and showing the valve structure in a pre-exhaust position with the regulator valve in a closed position, and the combination flow control and pre-exhaust valve in a pre-exhaust position to exhaust the downstream pressure to a previously set level.
Figure 8:
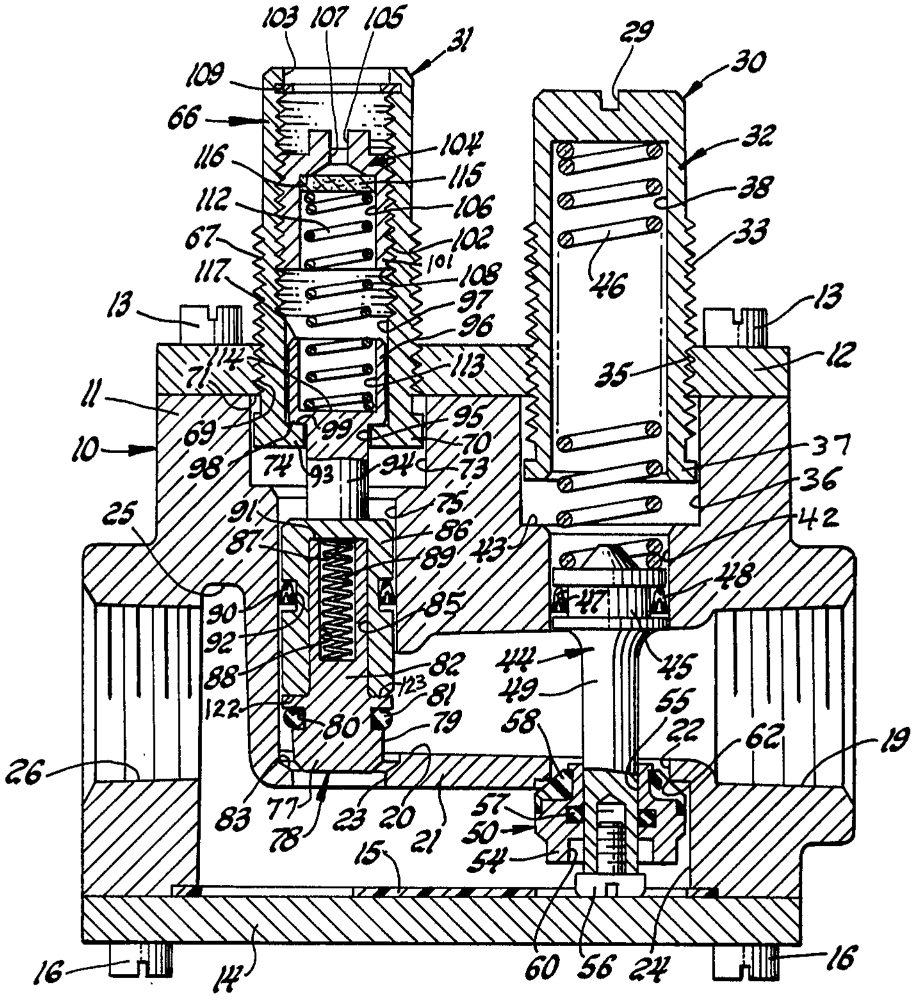
FIG. 8 is an elevation section view, similar to FIG. 2, and showing the valve structure in a flow control position, with the regulator valve in a checked position to block flow thereby, and the flow control valve in a flow control position for controlling flow of air from the downstream port to the upstream port.

When line pressure is removed from the upstream port 19 to allow exhausting or dumping of the downstream pressure, th downstream pressure in the lower interor passageway 24 moves the valve 78 upwardly in a very quick action against the light flow control spring 89. The downstream pressure moves the valve 78 upwardly to the raised position shown in FIG. 7 to allow the downstream pressure to flow out into the upper interior passageway 20 and out through the inlet port 19. The pressure differential between the lower interior passageway 24 and the upper interior passageway 20 maintains the regulator valve 50 in the closed position shown in FIG. 7 to block flow through the bore 22. When the downstream pressure is exhausted down to a predetermined, previously set pressure level, the pre-exhaust spring 112 moves the piston 86 and the valve 78 downwardly to the flow control position shown in FIG. 8, and the balance of pressurized air in the downstream system is exhausted from the piston end of the air cylinder in a flow controlled or meter out action. As shown in FIG. 8, during the last mentioned meter out action, the pressure is lower in the upper interior passageway 20 than in the lower interior passageway 24, whereby the regulator spring 46 moves the valve stem 44 downwardly, and the higher pressure acting in the lower interior passageway 24 holds the regulator check valve element 50 in the closed or checked position. When the last described flow control exhausting action is completed, the flow control valve 78 is moved downwardly by the flow control spring 89 to the initial closed position shown in FIG. 2. It will be seen, that the higher the pressure exerted on the pre-exhaust spring 112 by moving the valve stem 104 inwardly, the sooner the valve element 78 will move to the flow control position shown in FIG. 8. As an example only, if the downstream pressure is 80 lbs. per square inch, and a maximum load is applied on the spring 112, then the valve 78 would move to the flow control position of FIG. 8 when the downstream pressure is reduced to 60 lbs. per square inch. If it is desired to maintain the valve element 78 in the raised or pre-exhaust position of FIG. 7 until the downstream pressure is reduced to 30 lbs. per square inch, then the load on the spring 112 is decreased to provide the desired closing pressure.

The valve stem 66 controls the flow control function of the valve 78 by adjusting the distance between the top end 123 of the valve 78 and the lower end 122 of the piston 86. As viewed in FIG. 2, it will be seen that when the valve stem 66 is threaded inwardly, the lower end 122 of the piston 86 moves downwardly nearer to the top end 123 of the valve 78. Such inward movement of the valve stem 66 thus decreases the upward travel distance that the valve 78 can make when it is moved into the flow control position, as shown in FIG. 8. It will be seen that when the pre-exhaust function has been carried out, that the piston 86 is moved downwardly by the spring 112 to the position shown in FIG. 8, and that the amount of opening between the lower end of the valve 78 and the valve seat 83 is controlled by the gap or distance between the lower end 122 of the piston 86 and the upper end 123 of the valve 78. The spring 89 which normally biases the valve 78 into seating engagement with the valve seat 83 is a light spring, and it is just strong enough to lift the valve 78 to the closed position if the valve 10 is used in an inverted position. The valve stem 104 controls the pressure of the spring 112, which in turn controls the pressure at which the pre-exhaust action occurs. If the valve stem 104 is moved inwardly a large distance, the pressure on the spring 112 is increased which will in turn require a slower operation of the pre-exhaust function, whereas if the pressure on the spring 112 is decreased by threading the valve stem 104 outwardly, the pre-exhaust function occurs in a faster manner.

It will be seen that the valve of the present invention provides a regulating function when air is flowing through the valve 10 in one direction, and a pre-exhaust function and flow control or meter out function when air is exhausting through the valve 10 in the other direction, and that such functions are provided on air flowing through a single flow path. The single flow path is formed by the upper interior passageway 20 and the lower interior passageway 24. The combination pressure regulating and flow control valve of the present invention is simpler in construction, and smaller in overall configuration than the prior art valves providing such control actions. Accordingly, the valve of the present invention is economical, compact, and can be manufactured with less complicating manufacturing procedures. the pre-exhaust function is eliminated, and only the regulating and flow control or meter out functions are provided by the valve designated by the numeral **10*a*. The parts of the embodiment of FIG. 9 which are the same as the embodiment illustrated in FIGS. 1 through 8 have been marked with the same reference numerals followed by the small letter "a". The valve of FIG. 9 may be used for controlling the flow of pressurized air in an air flow circuit which includes an air controlled apparatus and wherein a reduced downstream pressure is desired. For example, only the valve of FIG. 9 may be used to control the flow of pressurized air to and from either end of an air cylinder in conjunction with the use of a valve as illustrated in FIGS. 1 through 8** for supplying pressurized air to the other end of the air cylinder and exhausting air therefrom, as set forth in the example hereinbefore.

Figure 9:
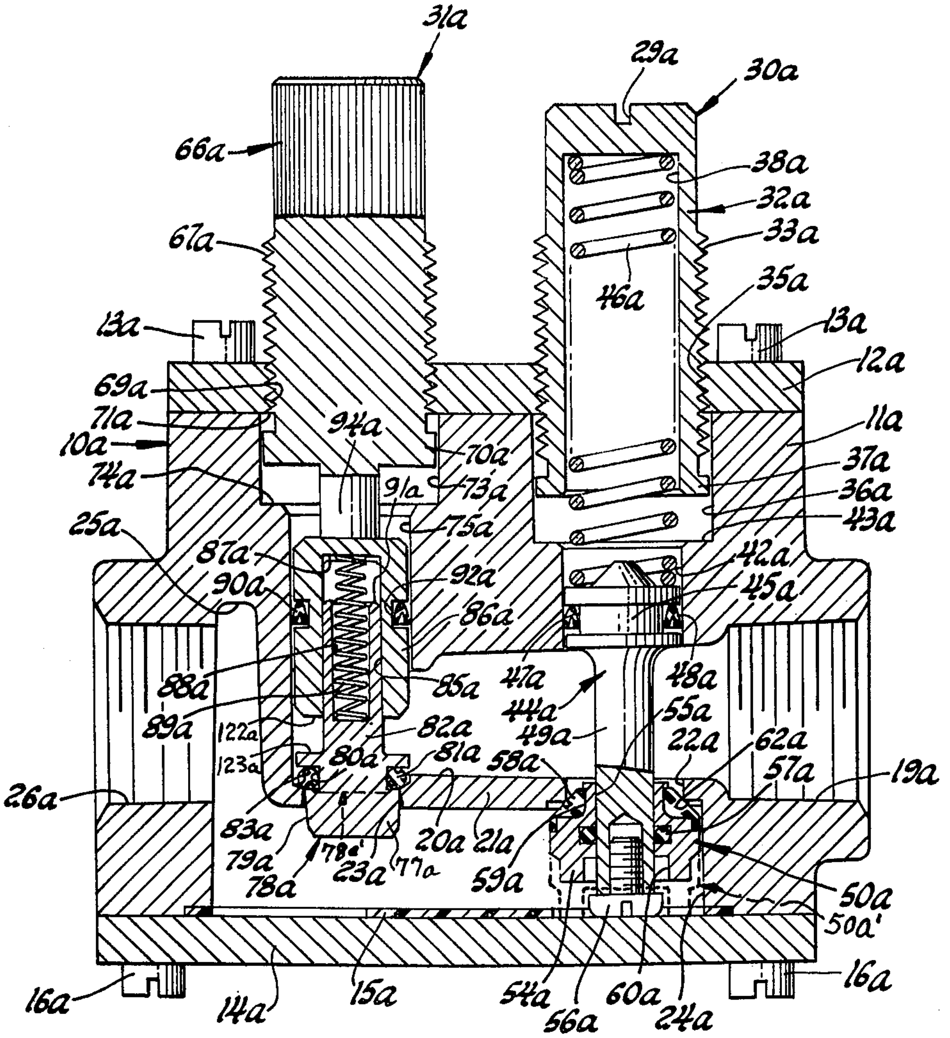
FIG. 9 is an elevation secton view of a modified valve of the present invention showing a combination regulator and check valve, and a flow control valve without a pre-exhaust valve, and in an at-rest position.

The pre-exhaust valve stem 104, piston 96 and spring 112 employed in the first embodiment are not shown or illustrated in the second embodiment of FIG. 9. The piston rod **94*a* is integrally attached to the inner end of the valve stem 66*a*. In use, the regulating valve 10*a* would function in the same manner as the embodiment of FIGS. 1–8 to supply a reduced downstream pressurized air to either end of an air cylinder, at a preset pressure level determined by the setting of the valve stem 32*a*. The numeral 50′ designates the open position of the valve 50*a* when pressurized air is flowing to an air cylinder or other application. The regulator valve 50*a* closes in the same manner as the first embodiment when the reducer set pressure is reached downstream. The differential pressure between the chambers 20*a* and 24*a* keeps the regulator valve 50*a* in the checked or closed position. When the supply air is turned off, the flow control valve 78*a* would be moved upwardly to an open flow control position determined by the position selected by adjusting the valve stem 66*a*. The adjusting of the valve stem 66*a* moves the lower end 122*a* of the piston 86*a*, which acts as a stop for the valve 78*a*, toward or away from the upper end 123*a* of the valve 78*a*, to adjust the distance the valve 78*a* can move from the closed position to an open flow control position. The illustrated open flow control position of the valve 78*a* is designated by the numeral 78*a*′. The amount of air exhausting past the flow control valve 78*a* would depend upon the position selected for the valve stem 66*a*. When the exhausting meter out action has been completed, the spring 89*a* returns the flow control valve 78*a* to the closed or checked position, and the valve of FIG. 9 would then be in an "at rest" position, with the regulator valve 50*a*** also being in a closed or checked position.

INDUSTRIAL APPLICABILITY

The combination pressure regulating and flow control valve of the present invention is adapted for use in industrial air use applications where a reduced downstream pressure is desired. For example only, said valve may be used for connection to either end of an air cylinder for controlling the operation of an air cylinder in either one direction, or both directions. The air cylinder would be employed in various types of industrial machines.

I claim:

1. A combination pressure regulating and flow control air valve, for controlling the flow of pressurized air through a flow circuit which includes a pneumatically controlled apparatus, characterized in that the valve includes:

(a) a valve body having an upstream pressurized air supply port for connection to a source of pressurized air, and a downstream working port for connection to a pneumatically controlled apparatus in said flow circuit, and a flow passage interconnecting said ports;

(b) an adjustable pressure regulator and check valve means operatively mounted in said flow passage which includes a movable valve stem member with a regulator and check valve element slidably mounted on the valve stem member and movable on the valve stem member between open and closed positions to provide a regulated downstream pressure at the downstream working port when pressurized air is flowing from the source of pressurized air into the upstream port and through the flow passage in one direction to the downstream port, and said regulator and check valve element closes to a checked position when the downstream pressure reaches a predetermined reduced level; and, (c) an adjustable flow control valve means operatively mounted in said flow passage, in parallel with said adjustable pressure regulator and check valve means, and having a flow control valve element movable to a closed position when pressurized air is flowing through the flow passage in said one direction to the downstream port and said flow control element being movable to an open position to provide a meter out action to a flow of air exhausting through said flow passage in the other direction to the upstream port and with said regulator and check valve element closed in a checked position.

2. A combination pressure regulating and flow control air valve, for controlling the flow of pressurized air through a flow circuit which includes a pneumatically controlled apparatus, characterized in that the valve includes:

(a) a valve body having an upstream pressurized air supply port for connection to a source of pressurized air, and a downstream working port for connection to pneumatically controlled apparatus in said flow circuit, and a flow passage interconnecting said ports;

(b) an adjustable pressure regulator and check valve means operatively mounted in said flow passage and having a regulator and check valve element movable between open and closed positions to provide a regulated downstream pressure at the downstream working port when pressurized air is flowing from the source of pressurized air into the upstream port and through the flow passage in one direction to the downstream port, and said regulator and check valve element closes to a checked position when the downstream pressure reaches a predetermined reduced level;

(c) an adjustable flow control valve means operatively mounted in said flow passage, in parallel with said adjustable pressure regulator and check valve means, and having a flow control valve element movable to a closed position when pressurized air is flowing through the flow passage in said one direction to the downstream port and said flow control element being movable to an open position to provide a meter out action to a flow of air exhausting through said flow passage in the other direction to the upstream port and with said regulator and check valve element closed in a checked position; and, (d) said adjustable flow control valve means includes adjustable quick exhaust valve structure which is selectively adjustable to allow the flow control valve element to be moved to a quick exhaust, free flow, open position when pressurized air is exhausting through said flow passage in said other direction to the upstream port, and to be moved to a flow control meter out open position after the downstream pressure of the exhausting air has been reduced to a predetermined level by the quick exhaust action, while the regulator and check valve element functions as a check valve in the closed position.

3. A combination pressure regulating and flow control air valve as defined in claim 2, characterized in that:

(a) said flow passage interconnecting said ports includes a first passage portion connected to said upstream supply port, and a second passage portion connected to said downstream working port, and said first and second passage portions are connected by a first bore having a pressure regulator valve seat formed on the end thereof adjacent the second passage portion, and a second bore is parallel to said first bore and has a flow control valve seat at the end thereof adjacent the first passage portion, and said adjustable pressure regulator and check valve means has a movable valve element for operable engagement with said pressure regulator valve seat, and said flow control valve means has a movable valve element for operable engagement with said flow control valve seat.

4. A combination pressure regulating and flow control air valve as defined in claim 3, characterized in that:

(a) said adjustable pressure regulator and check valve means includes a movable lower valve stem member, with said movable regulator valve element being slidably mounted on said lower valve stem member, and an adjustable bias means for exerting a bias on the lower valve stem member for regulating the downstream air pressure to a predetermined reduced level.

5. A combination pressure regulating and flow control air valve, as defined in claim 4, characterized in that:

(a) said adjustable bias means, for exerting a bias on the lower valve stem member includes, an upper valve stem member threadably mounted in the valve, and a spring member having one end in engagement with the upper valve stem member and the other end in engagement with the lower valve stem member, whereby when said upper valve stem member is adjusted inwardly of the valve, the desired bias increases on the lower valve stem member and when the upper valve stem member is adjusted outwardly of the valve, the bias on the lower valve stem member decreases.

6. A combination pressure regulator and flow control air valve, as defined in claim 5, characterized in that:

(a) said movable lower valve stem member has a head on one end thereof which is engaged by said spring member, and which is movably mounted in a third bore in the valve communicating with said first passage portion and spaced from and in alignment with said first bore which has a pressure regulator valve seat formed on the end thereof adjacent the second passage portion, and a pressure balancing seal means is mounted around said lower valve stem head and it seals an area in said third bore equal to the area of the pressure regulator valve seat engaged by the pressure regulator movable valve element.

7. A combination pressure regulator and flow control air valve as defined in claim 5, characterized in that:

(a) said adjustable flow control valve means includes a flow control valve stem member threadably mounted in the valve and operatively carrying said adjustable quick exhaust valve structure and flow control valve element.

8. A combination pressure regulator and flow control air valve as defined in claim 7, characterized in that:

(a) said adjustable quick exhaust valve structure includes a quick exhaust valve stem telescopically and threadably mounted in an axial bore in said flow control valve stem, a piston member is movably mounted in said axial bore in the flow control valve stem, a quick exhaust spring is mounted in said axial bore within said flow control valve stem and has one end abutting said movable piston member and the other end abutting the adjustable quick exhaust valve stem, a pre-exhaust piston is movably mounted in a bore communicating at one end with said axial bore in the flow control valve stem and communicating at the other end with said upper interior passageway, means is connected to said movable piston for abutting engagement with said pre-exhaust piston, and said flow control valve element is movably carried by said pre-exhaust piston.

9. A combination pressure regulator and flow control air valve as defined in claim 8, characterized in that:

(a) said pre-exhaust piston has an axial bore extended into one end thereof which has a closed end and an open end that communicates with said upper interior passageway;

(b) said flow control valve element has a valve stem slidably mounted in the bore in the pre-exhaust piston; and, (c) biasing means is operatively mounted in the bore in the pre-exhaust piston and normally biases the flow control valve element stem away from the closed end of the axial bore in the pre-exhaust piston.

10. A combination pressure regulator and flow control air valve as defined in claim 9, characterized in that:

(a) said pre-exhaust piston is provided with air seal means around the periphery thereof and is subject to a differential pressure of atmospheric air pressure on one end and upper interior passageway air pressure on the other end.

11. An adjustable pressure regulating air valve, for use in a flow control air valve having a valve body with an upstream pressurized air supply port for connection to a source of pressurized air, and a downstream working port for connection to a pneumatically controlled apparatus in a flow circuit, and a flow passage interconnecting said ports and including a first passage portion connected to the upstream supply port and a second passage portion connected to the downstream working port, and a first bore connecting said passage portions and having a pressure regulator valve seat formed on the end thereof adjacent the second passage portion, characterized in that:

(a) said adjustable pressure regulating valve includes a movable lower valve stem member mounted through said bore connecting said passage portions, with a regulating valve element slidably mounted on the lower valve stem member, and an adjustable biasing means for exerting a bias on the lower valve stem member for regulating the downstream air pressure to a predetermined level.

12. An adjustable pressure regulating air valve as defined in claim 11, characterized in that:

(a) said adjustable bias means for exerting a bias on the lower valve stem member includes an upper valve stem member threadably mounted in the valve, and a spring member having one end in engagement with the upper valve stem member and the other end in engagement with the lower valve stem member, whereby when said upper valve stem member is adjusted inwardly of the valve, the desired bias increases on the lower valve stem member and when the upper valve stem member is adjusted outwardly of the valve, the bias on the lower valve stem member decreases.

13. An adjustable pressure regulating air valve, as defined in claim 12, characterized in that:

(a) said movable lower valve stem member has a head on one end thereof which is engaged by said spring member, and which is movably mounted in a second bore in the valve which communicates with said first passage portion and which is spaced therefrom and in alignment with said first bore and which has a pressure regulator valve seat formed on the end thereof adjacent the second passage portion, and a pressure balancing seal means is mounted around said lower valve stem head and it seals an area in said second bore equal to the area of the pressure regulator movable valve element.

14. An adjustable flow control and quick exhaust valve for use in a flow control air valve having a valve body with an upstream pressurized air supply port for connection to a source of pressurized air, and a downstream working port for connection to a pneumatically controlled apparatus in a flow circuit, and a flow passage interconnecting said ports, characterized in that:

(a) said adjustable flow control and quick exhaust valve includes, a movable flow control valve element for controlling the flow of air through said flow passage, a flow control valve stem member threadably mounted in the valve, a quick exhaust valve stem telescopically and threadably mounted in an axial bore in said flow control valve stem member, a piston member movably mounted in said axial bore in the flow control valve stem member, a quick exhaust spring mounted in said axial bore within said flow control valve stem member, and having one end abutting said movable piston member and the other end abutting the adjustable quick exhaust valve stem, a pre-exhaust piston movably mounted in a bore, communicating at one end with said axial bore in the flow control valve stem, and communicating at the other end with said upstream air supply port, means connected to said movable piston for abutting engagement with said pre-exhaust piston, and said flow control valve element is movably carried by said pre-exhaust piston.

* * * * *

UNITED STATES PATENT OFFICE
CERTIFICATE OF CORRECTION

Patent No. 4,279,271 Dated July 21, 1981

Inventor(s) James A. Neff

It is certified that error appears in the above-identified patent and that said Letters Patent are hereby corrected as shown below:

Column 4, line 40, after "the", insert --lower--.

Column 9, line 31, following "procedures.", insert paragraph beginning with --Figure 9 illustrates a modified valve embodiment made in accordance with the principles of the present invention,wherein--.

Signed and Sealed this

*Twenty-second* Day of *September 1981*

[SEAL]

*Attest:*

GERALD J. MOSSINGHOFF

*Attesting Officer* *Commissioner of Patents and Trademarks*